United States Patent
Kim et al.

(10) Patent No.: US 10,491,354 B2
(45) Date of Patent: Nov. 26, 2019

(54) METHOD AND APPARATUS FOR TRANSMITTING DATA IN DIRECT DEVICE-TO-DEVICE COMMUNICATION

(71) Applicant: Electronics and Telecommunications Research Institute, Daejeon (KR)

(72) Inventors: Ji Hyung Kim, Daejeon (KR); JaeSheung Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 301 days.

(21) Appl. No.: 15/190,840

(22) Filed: Jun. 23, 2016

(65) Prior Publication Data

US 2016/0381670 A1  Dec. 29, 2016

(30) Foreign Application Priority Data

Jun. 23, 2015  (KR) .................. 10-2015-0089154
Jun. 14, 2016  (KR) .................. 10-2016-0074058

(51) Int. Cl.
*H04W 72/04* (2009.01)
*H04L 5/00* (2006.01)

(52) U.S. Cl.
CPC .......... *H04L 5/0055* (2013.01); *H04L 5/0048* (2013.01)

(58) Field of Classification Search
CPC .... H04L 5/0055; H04L 5/0048; H04W 92/18; H04W 72/04; H04W 72/0406
See application file for complete search history.

(56) References Cited

U.S. PATENT DOCUMENTS

| | | |
|---|---|---|
| 8,019,318 B2 | 9/2011 | Yoon et al. |
| 8,942,083 B2 | 1/2015 | Choi et al. |
| 2009/0201885 A1 | 8/2009 | Kuroda et al. |
| 2010/0157918 A1 | 6/2010 | Kim et al. |
| 2011/0134903 A1 | 6/2011 | Ko et al. |
| 2014/0140274 A1 | 5/2014 | Kuroda et al. |

(Continued)

FOREIGN PATENT DOCUMENTS

| | | |
|---|---|---|
| JP | 4737553 B2 | 8/2011 |
| KR | 100800996 B1 | 1/2008 |

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 V12.5.0, Mar. 2015, pp. 1-136, 3GPP Organizational Partners.

(Continued)

*Primary Examiner* — Khaled M Kassim
*Assistant Examiner* — Syed Ali
(74) *Attorney, Agent, or Firm* — William Park & Associates Ltd.

(57) ABSTRACT

A method and an apparatus for transmitting data in communication between terminals are provided. A terminal disposes at least one first reference signal configured based on a first parameter. The terminal disposes at least one second reference signal configured based on a second parameter, in addition to the first reference signal configured based on a first parameter. Data of a first structure in which the first reference signal is included or data of a second structure in which the first reference signal and the second reference signal are included is transmitted.

19 Claims, 9 Drawing Sheets

(56) References Cited

U.S. PATENT DOCUMENTS

| | | | |
|---|---|---|---|
| 2016/0029333 A1* | 1/2016 | Seo | H04L 27/2655 |
| | | | 370/350 |
| 2017/0105179 A1* | 4/2017 | Kusashima | H04W 52/30 |
| 2017/0373738 A1* | 12/2017 | Chae | H04L 5/00 |
| 2018/0098321 A1* | 4/2018 | Chae | H04J 11/0076 |
| 2018/0176892 A1* | 6/2018 | Kim | H04W 72/0406 |
| 2018/0213549 A1* | 7/2018 | Kim | H04W 28/0278 |
| 2018/0219701 A1* | 8/2018 | Seo | H04J 11/00 |
| 2018/0270822 A1* | 9/2018 | Chae | H04W 72/0453 |
| 2018/0338319 A1* | 11/2018 | Kim | H04W 76/14 |
| 2018/0376471 A1* | 12/2018 | Chae | H04L 27/26 |
| 2019/0045345 A1* | 2/2019 | Lee | H04J 11/00 |
| 2019/0075547 A1* | 3/2019 | Chae | H04W 4/40 |
| 2019/0191441 A1* | 6/2019 | Kusashima | H04J 11/0079 |
| 2019/0229964 A1* | 7/2019 | Ouchi | H04L 27/2613 |

OTHER PUBLICATIONS

"Considerations on enhanced DMRS for V2V," 3GPP TSG RAN WG1 Meeting #82bis, R1-155840, Oct. 5-9, 2015, pp. 1-2.

* cited by examiner

METHOD AND APPARATUS FOR TRANSMITTING DATA IN DIRECT DEVICE-TO-DEVICE COMMUNICATION

CROSS-REFERENCE TO RELATED APPLICATION

This application claims priority to and the benefit of Korean Patent Application Nos. 10-2015-0089154 and 10-2016-0074058 filed in the Korean Intellectual Property Office on Jun. 23, 2015 and Jun. 14, 2016, the entire contents of which are incorporated herein by reference.

BACKGROUND OF THE INVENTION (a) Field of the Invention

The present invention relates to a method for data transmission. More particularly, the present invention relates to a method and an apparatus for transmitting data in direct device-to-device communication.

(b) Description of the Related Art

In a wireless communication system, when reception/transmission for data between terminals (e.g., between vehicles) is performed, reliability and delay time should be considered. Recently, along with the development of wireless communication systems, device-to-device (D2D) communication has been issued. Particularly, as the Long Term Evolution (LTE)-Advanced technology becomes commercially available, methods related to the D2D communication based on this have been researched. In the D2D communication, without the support of a network device such as a base station, terminals can form and maintain a D2D communication network by using distributed and limited radio resources, and operations such as synchronization, peer discovery, paging, and data traffic communication are performed.

This D2D communication operates based on proximity, and has many advantages of increased efficiency of network resources, reduced power consumption of a terminal, expanded communication coverage, and the like, but reliability and delay time are relatively low. In D2D communication, for example, in a service in which data is transmitted/received between vehicles, higher reliability and higher delay time are required. Furthermore, high movement speed needs to be considered. When the D2D communication is performed with high movement speed, there is a difficulty in meeting requirements for some modulation coding schemes (MCS) in initial transmission. In addition, when retransmitting, requirements for movement speed and other requirements may not be satisfied.

Accordingly, to meet requirements for high reliability and delay time for various movement speeds, the transmission scheme needs to be changed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for transmitting data having advantages of performing effective communication between terminals in consideration of movement speed.

An exemplary embodiment of the present invention provides a method for transmitting data in communication between terminals. The method includes disposing at least one first reference signal configured based on a first parameter; disposing at least one second reference signal configured based on a second parameter, in addition to the first reference signal configured based on a first parameter; and transmitting data of a first structure in which the first reference signal is included or data of a second structure in which the first reference signal and the second reference signal are included.

The first reference signal may be configured based on scrambling using an identification (ID) of a terminal, the second reference signal may be configured based on common sequence, and the data may be transmitted through a Physical Sidelink Shared Channel (PSSCH).

The transmitting of data may include transmitting the data of the first structure or the data of the second structure according to at least one among movement speed and a Modulation Coding Scheme (MCS).

In addition, the transmitting of data may include transmitting the data of the first structure when the movement speed is slower than a predetermined speed; and transmitting the data of the second structure when the movement speed is faster than a predetermined speed.

In addition, the transmitting of data may include transmitting one among the data of the first structure and the data of the second structure every transmission time, wherein a transmission order including an order for transmitting the data of the first structure and an order for transmitting the data of the second structure may be provided from a base station.

In addition, the transmitting of data may include iteratively transmitting the data having been transmitted, wherein a transmission time at which the data of the first structure is transmitted and a transmission time at which the data of the second structure is transmitted may be adjusted by the base station, and the order for transmitting the data of the first structure and the order for transmitting the data of the second structure may be adjusted by the base station.

The method may further include transmitting, by a terminal, information for determining the transmission time to the base station, wherein the transmission time may be determined based on at least one among movement speed of the terminal and number of receptions, and the transmission time may be determined based on the ID of the terminal and an Acknowledgment/Negative acknowledgement (ACK/NACK) representing whether or not data is successfully restored as well as the number of receptions when the transmission time is determined based on the number of receptions.

The transmitting of information may include transmitting a message including the ID of the terminal and the number of receptions to the base station if whether or not data is successfully restored is the NACK when a size of a message including the information is greater than a predetermined size.

The transmission order may be adjusted so that data received once between terminals communicating with each other is the data of the second structure, and the transmission time may be adjusted when a relative speed difference is greater than a predetermined reference value so that terminals communicating with each other receive data transmitted from an opponent terminal two or more times.

Another exemplary embodiment of the present invention provides a terminal for transmitting data in communication between terminals. The terminal includes a radio frequency converter transmitting and receiving a signal through an antenna; and a processor that is connected to the radio frequency converter and is configured to perform processing for data transmission, wherein the processor includes a data transmission processing unit configured to transmit data of a first structure in which at least one first reference signal configured based on a first parameter is disposed or data of a second structure in which at least one second reference signal configured based on a second parameter is further disposed in addition to the first reference signal configured based on a first parameter.

The first reference signal may be configured based on scrambling using an identification (ID) of a terminal and the second reference signal may be configured based on a common sequence, wherein the data transmission processing unit may be configured to transmit the data of the first structure or the data of the second structure according to at least one among movement speed and a Modulation Coding Scheme (MCS).

The data transmission processing unit may be configured to transmit one among the data of the first structure and the data of the second structure every transmission time, wherein the processor may further include a transmission information acquisition processing unit configured to provide a transmission order including an order for transmitting the data of the first structure and an order for transmitting the data of the second structure that are provided from a base station.

The data transmission processing unit may be configured to iteratively transmit the data having been transmitted, wherein a transmission time at which the data of the first structure is transmitted and a transmission time at which the data of the second structure is transmitted may be adjusted by the base station, and the order for transmitting the data of the first structure and the order for transmitting the data of the second structure may be adjusted by the base station.

In addition, the processor may further include a terminal information provision processing unit configured to provide information for determining the transmission time to the base station, wherein the terminal information provision processing unit may be configured to provide at least one among movement speed of the terminal and number of receptions to the base station, and further provide the ID of the terminal and an Acknowledgment/Negative acknowledgement (ACK/NACK) representing whether or not data is successfully restored when transmitting the number of receptions.

Yet another exemplary embodiment of the present invention provides a method for determining information for data transmission of a terminal in communication between terminals. The method includes determining, by a base station, an order for transmitting data of a first structure in which at least one first reference signal configured based on a first parameter is disposed; determining, by the base station, an order for transmitting data of a second structure in which at least one second reference signal configured based on a second parameter is further disposed in addition to the first reference signal; and transmitting, by the base station, a transmission order including an order for transmitting the data of the first structure and an order for transmitting the data of the second structure.

The first reference signal may be configured based on scrambling using an identification (ID) of a terminal, and the second reference signal may be configured based on a common sequence, wherein the order for transmitting the data of the first structure and the order for transmitting the data of the second structure may be changed according to at least one among movement speed and a Modulation Coding Scheme (MCS).

The method may further include acquiring terminal information from a terminal, by the base station, for determining transmission time at which data is transmitted; determining, by the base station, the transmission time based on movement speed when the terminal information is the movement speed of the terminal; and determining, by the base station, the transmission time based on a number of receptions and an ID of the terminal that is further included in the terminal information when the terminal information includes the number of receptions.

The determining of the transmission time based on a number of receptions and an ID of the terminal that is further included in the terminal information may include determining, by the base station, the transmission time in further consideration of an Acknowledgment/Negative acknowledgement (ACK/NACK) representing whether or not data is successfully restored that is included in the terminal information.

The determining of the transmission time based on movement speed may include calculating a relative speed difference of terminals communicating with each other; and adjusting the transmission time when the relative speed difference is greater than a predetermined reference value so that the terminals receive data transmitted from an opponent terminal two or more times.

The method may further include adjusting the transmission order when the transmission time cannot be adjusted so that the terminals receive data transmitted from an opponent terminal two or more times, such that data received once between the terminals communicating with each other is data of the second structure.

DETAILED DESCRIPTION OF THE EMBODIMENTS

Figure 1:
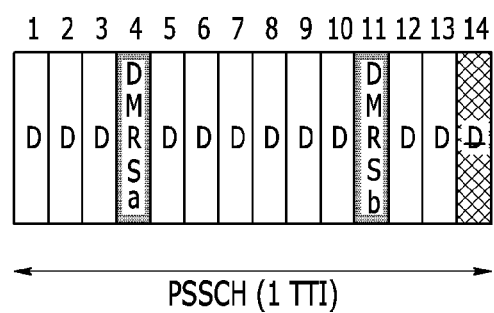
FIG. 1 shows an example of a structure of a Physical Sidelink Control Channel (PSSCH) according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, in addition, unless explicitly described to the contrary, the word "comprise" and variations such as "comprises" or "comprising" will be understood to imply the inclusion of stated elements but not the exclusion of any other elements.

Through the specification, a terminal may designate a terminal, a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include the entire or partial functions of the MT, the MS, the AMS, the HR-MS, the SS, the PSS, the AT, the UE, etc.

A base station may designate an advanced base station (ABS), a high reliability base station (HR-BS), a node B (nodeB), an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (HR-RS) serving as a base station, a high reliability relay station (HR-RS) serving as a base station, a small base station (a femto BS, a home node B (HNB), a home eNodeB (HeNB), a pico BS, a metro BS, a micro BS, etc.), etc., and may include all or some functions of the ABS, the nodeB, the eNodeB, the AP, the RAS, the BTS, the MMR-BS, the RS, the RN, the ARS, the HR-RS, the small base station, etc.

Hereinafter, a method and an apparatus for data transmission according to an exemplary embodiment of the present invention will be described.

In the LTE (Long Term Evolution)-based device-to-device (D2D) communication, a terminal transmits data through the following steps.

Step 1: Performs resource allocation for a Physical Sidelink Shared Channel (PSSCH) through a Physical Sidelink Control Channel (PSCCH) and determines a Modulation and Coding Scheme (MCS) applied to the PSSCH.

Step 2: Performs data transmission through the PSSCH according to the scheduling.

Transmitting/receiving a signal through a channel such as a PSCCH, a PSSCH, and others may be described in a form of "transmitting/receiving a channel such as a PSCCH, a PSSCH, and others".

In an exemplary embodiment of the present invention, a control channel includes a PSCCH and a data channel includes a PSSCH, but they are not limited thereto.

For communication between terminals, data is transmitted/received by using a PSSCH.

FIG. 1 shows a structure of a PSSCH according to an exemplary embodiment of the present invention. The structure of a PSSCH at 1 Transmission Time Interval (TTI) is shown in FIG. 1, and the structure of a PSSCH is generally the same as an uplink Physical Uplink Shared Channel (PUSCH). Two DeModulation Reference Signal (DMRS) symbols DMRS a and DMRS b are disposed within in 1 TTI, and the sequence of the two symbols DMRS a and DMRS b may be configured based on the parameters of the following Table 1.

TABLE 1

| Parameter | | DMRS a, b |
|---|---|---|
| Group hopping | | enabled |
| | $n_{ID}^{RS}$ | $n_{ID}^{SA}$ |
| | $n_s$ | $n_{ss}^{PSSCH}$ |
| | $f_{ss}$ | $n_{ID}^{SA} \bmod 30$ |
| Sequence hopping | | disabled |
| Cyclic shift | $n_{cs,\lambda}$ | $\lfloor n_{ID}^{SA}/2 \rfloor \bmod 8$ |
| Orthogonal sequence | $[w^\lambda(0) \; w^\lambda(1)]$ | $[+1 \; +1]$ if $n_{ID}^{SA} \bmod 2 = 0$ |
| | | $[+1 \; -1]$ if $n_{ID}^{SA} \bmod 2 = 1$ |
| Reference signal length | $M_{sc}^{RS}$ | $M_{sc}^{PSSCH}$ |
| Number of layers | $\upsilon$ | 1 |
| Number of antenna ports | P | 1 |

In FIG. 1, the last symbol (the fourteenth symbol in FIG. 1) is not transmitted for half-duplex synchronization.

The DMRS is used for estimating a channel and a signal-to-noise ratio (SNR), and is used to demodulate and decode data at the receiving end. At the receiving end, the channel of the remaining data symbol is estimated by using the pilot signal of the DMRS, and the data symbols are restored symbols. At this time, when the channel is rapidly changed by the mobility, there may be a limit on the performance of the channel estimation and symbol recovery.

To solve this, various channel estimating schemes are used. However they have high complexity, and therefore the processing time becomes longer and the cost of a terminal increases. Further, a scheme among them has to ascertain channel characteristics, and therefore it is difficult for it to be substantially applied. Particularly, a radio channel for data transmission between vehicles may have a wide sense stationary channel characteristic rather than a non-stationary channel characteristic, and therefore it may be difficult to apply the scheme to the radio channel.

In an exemplary embodiment of the present invention, a DMRS of a pilot signal is more disposed at a time axis to keep up with the change of the channel.

If the DMRS occupying all of one symbol is more disposed, data transmission efficiency may be reduced. Similar to a Physical Downlink Shared Channel (PDSCH) of a downlink data channel, a scheme in which pilot symbols are distributed at a time axis while being disposed in some subcarriers may be considered, which increases a Peak-to-Average Power Ratio (PAPR). In addition, when considering Multi-Input Multi-Output (MIMO), the larger the number of transmission antennas channel is, the lower the performance is.

Accordingly, in consideration of data transmission efficiency and channel estimating performance, a DMRS occupying all of one symbol may to be disposed as much as possible.

Figure 2:
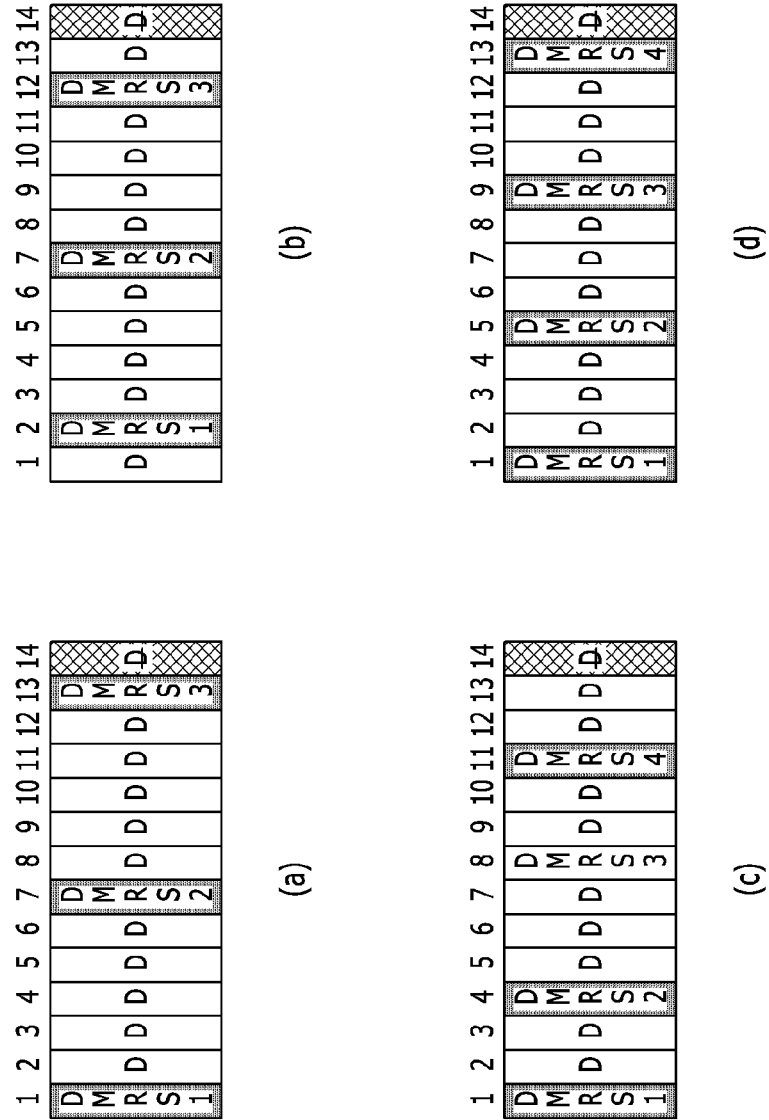
FIG. 2 shows an example of DeModulation Reference Signal (DMRS) arrangement according to an exemplary embodiment of the present invention.

FIG. 2 shows an example of a DMRS arrangement according to an exemplary embodiment of the present invention.

Three DMRS symbols DMRS 1, DMRS 2, and DMRS 3 may be disposed as shown in (a) and (b) of FIG. 2, and four DMRS symbols DMRS 1, DMRS 2, DMRS 3, and DMRS 4 may be disposed as shown in (c) and (d) of FIG. 2. Two DMRS among n DMRSs (n=1, 2, 3, 4) may be configured based on the parameters in Table 1 as the DMRS a and the DMRS b, and the remainder of them may be configured based in the parameters in the following Table 2.

TABLE 2

| Parameter | | DMRS n |
|---|---|---|
| Group hopping | | disabled |
| | $n_{ID}^{RS}$ | — |
| | $n_s$ | — |
| | $f_{ss}$ | 0 |
| Sequence hopping | | disabled |
| Cyclic shift | $n_{cs, \lambda}$ | 0 |
| Orthogonal sequence | $[w^\lambda(0)\ w^\lambda(1)]$ | disabled |
| Reference signal length | $M_{sc}^{RS}$ | $M_{sc}^{PSSCH}$ |
| Number of layers | $\upsilon$ | 1 |
| Number of antenna ports | P | 1 |

The remainder of the n DMRSs, that is, the DMRSs in addition to the existing DMRSs DMRS a and DMRS b, are configured with a common sequence without scrambling by using an identification (ID) so that the sequence may be read even if the ID is not known. Though this, it is possible to estimate a channel, and the ID may also be estimated by the DMRS a and the DMRS b in a blind manner by using correlation and other methods.

Figure 3:
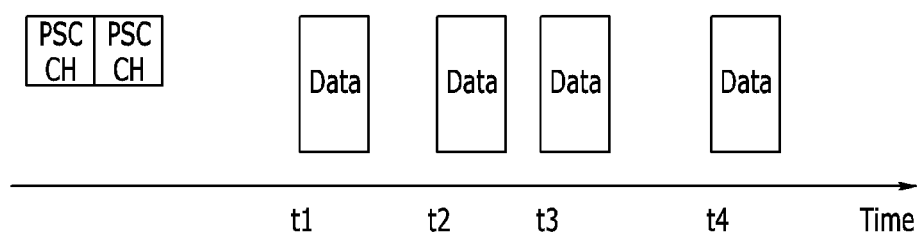
FIG. 3 shows an example of data transmission through a communication channel according to an exemplary embodiment of the present invention.

FIG. 3 shows an example of data transmission through a communication channel according to an exemplary embodiment of the present invention.

As shown in FIG. 3, in LTE-based D2D communication, a PSCCH of a control channel for data reception information is iteratively transmitted two times, and a PSSCH of a data channel is iteratively transmitted four times. Here, the transmitted PSSCHs have the same base data. One data block may be configured with multiple TTIs in FIG. 3.

In this case, when different terminals simultaneously transmit PSCCHs or when a terminal does not receive a PSCCH due to communication with a base station, the data of the PSSCH corresponding to the PSCCH cannot be restored. This is because the information, which is included in the PSCCH and includes data position, parameters related to synchronization, MCS, and others, on the corresponding PSSCH is not known as well as the ID used to scramble corresponding data, is not known. The added DMRSs are configured with the common sequence in an exemplary embodiment of the present invention, and therefore it possible to estimate a channel by the added DMRSs when searching for the position of the data in the PSSCH. The difference between the added DMRS and the existing DMRSs DMRS a and DMRS b is whether the scrambling is performed, and therefore, conversely, the ID ($n_{ID}^{SA}$) may be estimated.

Meanwhile, when there are a PSSCH (which will also be referred to as a PSSCH 1) of the structure as in FIG. 1 and a PSSCH (which will also be referred to as a PSSCH 2) of the structure as in FIG. 2, it is possible to select and transmit one among the PSSCH1 and the PSSCH2 according to movement speed and an MCS. Here, the structure as in FIG. 1 represents that two DMRSs are disposed within one TTI and are configured based on the parameters in Table 1 as above, and which may be referred to as "a first structure" for convenience of explanation. The structure as in FIG. 2 represents that at least one DMRS is further disposed in addition to the two DMRSs within one TTI, the two DMRSs are configured based on the parameters in Table 1, and the further disposed DMRS is configured based on the parameters in Table 2, which may be referred to as "a second structure" for convenience of explanation. When movement speed is slower than predetermined speed, the PSSCH1 of the first structure may have better performance than that of the PSSCH2 of the second structure. When movement speed is faster than the predetermined speed, the PSSCH2 of the second structure may have better performance than that of the PSSCH1 of the first structure. Along with this, since a low MCS is strong to movement speed, the PSSCH1 may be applied when the low MCS is used and the PSSCH2 may be applied when a high MCS is used.

In a case of broadcasting/multicasting, the information on the surrounding channel environment is generally insufficient, and thus it needs to consider a poor channel environment. Therefore, it is possible to select one from among the PSSCH1 and the PSSCH2. In an exemplary embodiment of the present invention, when iteratively transmitting data, the PSSCH of the first structure and the PSSCH of the second structure are transmitted together. For example, in FIG. 3, it is assumed that data at t1 is "data1", data at t2 is "data2", data at t3 is "data3", and data at t4 is "data4", and the data 1 and the data 3 are transmitted with the PSSCH 2 of the second structure and the data 2 and the data 4 are transmitted with the PSSCH 1 of the first structure. That is, the data is transmitted according to the following equation.

$$\text{Data } i(i \in \{1,2,3,4\}) = \text{PSSCH 1},$$

$$\text{Data } j(j \in \{1,2,3,4\}, j \neq i) = \text{PSSCH 2} \qquad \text{[Equation 1]}$$

The information on the data transmission may be included in the PSCCH or is separately transmitted by a base station. For example, when the maximum number (e.g., 4) of iterative transmissions is known, only the i at which the PSSCH1 of the first structure is transmitted or the j at which the PSSCH 2 of the second structure is transmitted has to be known. In this case, the number of 15 cases occurs, and resultantly, a message of 4 bits is included in a PSCCH or a control channel transmitted by a base station.

Along with such data transmission, a method for receiving data which are iteratively transmitted with a scheme being robust to the mobility is further considered in an exemplary embodiment of the present invention. More specifically, even in that case in which all data is configured with the PSSCH1, if a receiving terminal receives data iteratively transmitted at least k (k≥2) times and restores them, it may be less affected by the mobility. This is related to a transmission time or half-duplex.

Figure 4:
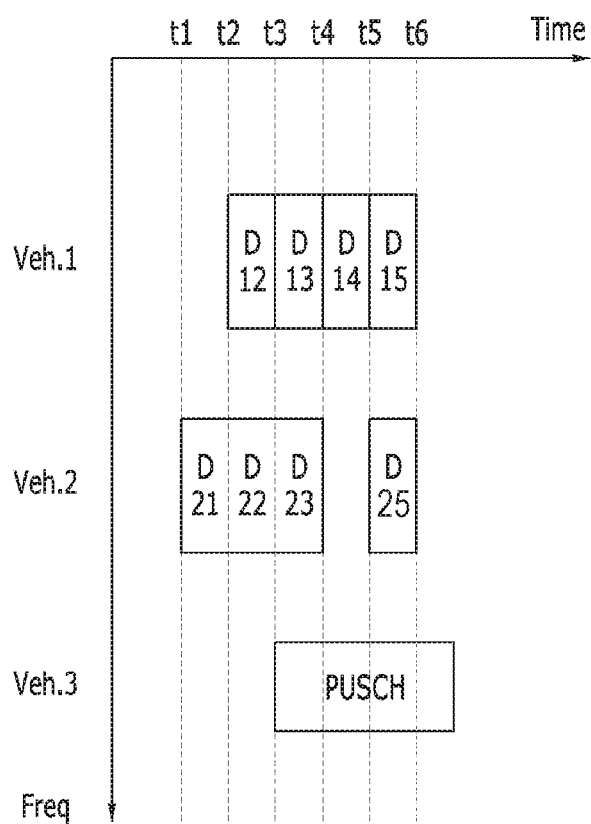
FIG. 4 shows a transmission/reception time of a terminal according to an exemplary embodiment of the present invention.

FIG. 4 shows a transmission/reception time of a terminal according to an exemplary embodiment of the present invention.

Each terminal (Veh.n, n=1, 2, 3) iteratively transmits the same primary data as in FIG. 4. Specifically, the terminal1 Veh.1 iteratively transmits the same primary data from t2 to t5. The data transmitted at time t2 is referred to as "D12" and the data transmitted at time t5 is referred to as "D15". Thus, the data that the terminal1 Veh.1 transmits at each time from t2 to t5 is D12, D13, D14, and D15. The terminal2 Veh.2 iteratively transmits the same primary data at each time from t1 to t3 and t5. The data that the terminal2 Veh.2 transmits at each time from t1 to t3 and t5 is D21, D22, D23, and D25. Meanwhile, the terminal3 Veh.3 transmits uplink (communication with a base station) data at each time from t3 to t6 through a PUSCH.

It is considered that data at a time except for the time at which a terminal transmits data is received. The terminal1 Veh.1 may receive the data transmitted from the terminal2 Veh.2 at once, that is, may receive the data D21 at time t1. The terminal 2 Veh.2 may receive the data transmitted from the terminal 1 Veh.1 at once, that is, may receive the data D14 at time t4. The terminal 3 Veh.3 may receive the data transmitted from the terminal 1 Veh.1 at once, that is, may receive the data D12 at time t2. Also, the terminal 3 Veh.3 may receive the data transmitted from the terminal 2 Veh.2 two times, that is, may receive the data D21 at time t1 and the data D22 at time t2. In other words, even when each terminal transmits the same data four times, all of the data transmitted four times may not be received according to the transmission/reception time. Accordingly, even though data is iteratively transmitted to be less affected by the mobility, the data may not be iteratively received. Therefore, for a receiving terminal to iteratively receive data, settlement is required.

When a terminal is located within a cell of a base station, the base station may determine transmission time of each terminal. In this case, the base station transmits the transmission time determined for each terminal to terminals through a control channel. In order to deal with the mobility, a terminal transmits information to the base station through a Physical Uplink Control Channel (PUCCH). The information (hereinafter, it may be referred to as terminal information) transmitted to the base station to deal with the mobility includes movement speed or the number of receptions. When the terminal information transmitted to the base station is movement speed, the movement speed refers to the movement speed of the terminal. At this time, a level for the movement speed may be transmitted so that the number of bits of the message including the terminal information can be reduced. For example, when a level 1 corresponds to a first speed range and the movement speed of the terminal is included within the first speed range, the message including the level 1 related to the movement speed of the terminal is transmitted to the base station through a PUCCH.

When the terminal information transmitted to the base station is the number of receptions, the terminal information further includes the ID of the terminal and Acknowledgment/Negative acknowledgement (ACK/NACK) representing whether or not data is successfully restored, in addition to the number of receptions. If the size of the message is greater than a predetermined size, when whether or not data is successfully restored is the NACK, the ID of the terminal and the number of receptions are only transmitted without the NACK. When the size of the message is greater than a predetermined size and whether or not data is successfully restored is the ACK, the ID of the terminal and the number of receptions are transmitted together with the ACK.

Meanwhile, the base station may adjust the transmission time for a terminal based on the terminal information from the terminal. When receiving the movement speed from the terminal as the terminal information, the base station adjusts the transmission time of terminals to receive data two or more times when the relative speed difference between terminals is greater than a reference value τ. Here, the relative speed difference between terminals may be calculated based on the movement speed received from each terminal. For example, in communication between a first terminal and a second terminal, when the relative speed difference between the relative speed of the first terminal and the relative speed of the second terminal is greater than the reference value τ, the base station adjusts the transmission time of at least one among the first terminal and the second terminal so that the first terminal and the second terminal receive the data transmitted from the opponent terminal two or more times. Also, the base station adjusts the transmission time of terminals to receive data two or more times when receiving the NACK from a terminal.

Meanwhile, when the transmission time is not set for terminals to receive data two or more times due to a plurality of terminals, the base station adjusts the j in Equation 1 so that the data received once by a terminal is the PSSCH 2. That is, the order j of transmitting the data of the second structure is adjusted.

The two schemes as above, that is, a first scheme for adjusting the transmission time so that terminals may receive data two or more times and a second scheme for adjusting the j in Equation 1 so that the data received once by a terminal is the PSSCH 2 may be variously combined.

For example, it is assumed that the reduced performance is very low when receiving data two or more times and the performance undergoes a lot of impact on the mobility when receiving data once. When the data received by the terminal1 Veh.1 and the terminal 2 Veh.2 is NACK or when the relative speed difference is greater than the reference value, the data D14 to be received once by the terminal 1 Veh.1 and the data D212 to be received once by the terminal 2 Veh.2 is configured with the PSSCH 2. When the data received by the terminal1 Veh.1 and the terminal 3 Veh.3 is NACK or when the relative speed difference is greater than the reference value, the data D12 to be received once by the terminal 1 Veh.1 and the terminal 3 Veh.3 respectively is configured with the PSSCH 2.

Figure 5:
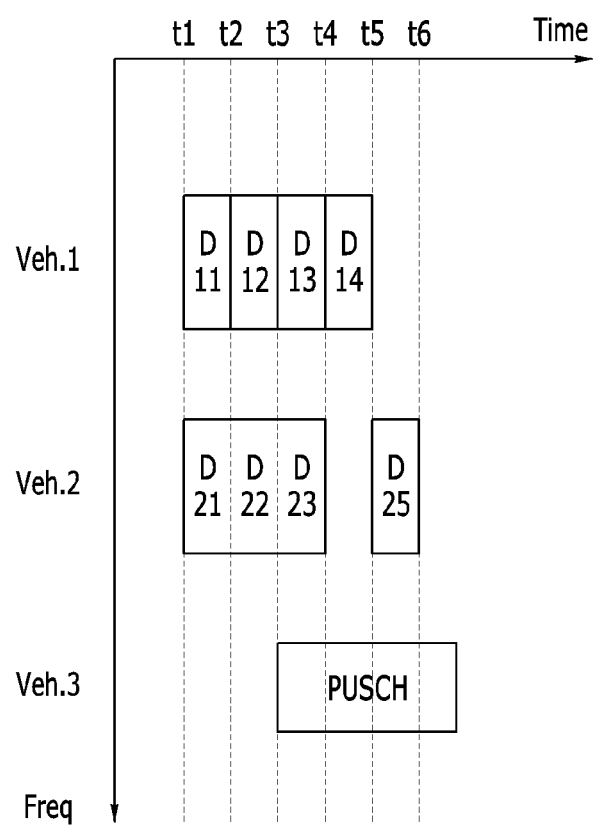
FIG. 5 shows the changed transmission/reception time of a terminal according to an exemplary embodiment of the present invention.

FIG. 5 shows the changed transmission/reception time of a terminal according to an exemplary embodiment of the present invention.

As above, if the transmission time of the terminals in FIG. 4 is adjusted in combination of the first scheme and the second scheme, as shown in FIG. 5, the data to be received once by the terminal 1 Veh.1 and the data to be received once by the terminal 2 Veh.2 may be configured in the PSSCH 2 as well as the transmission time of the terminal 1 Veh.1 so that the terminal 3 Veh.3 may receive all of the data D1 and D2 two or more times. Specifically, the transmission time from t2 to t5 of the terminal 1 Veh.1 is changed into transmission time from t1 to t4, and the data D14 to be transmitted by the terminal 1 Veh.1 is configured in the format of the PSSCH 2. Then, the data D 25 to be transmitted by the terminal 2 Veh.2 is configured in the format of the PSSCH 2.

As above, for the communication between terminals, a data channel structure suitable for a channel of high movement speed and a data channel structure efficient for various movement speeds in iterative transmission are optionally provided, and/or the transmission time adjustment for a terminal requiring iterative reception is performed. Therefore, it is possible to perform communication between terminals to be efficient for the mobility.

Figure 6:
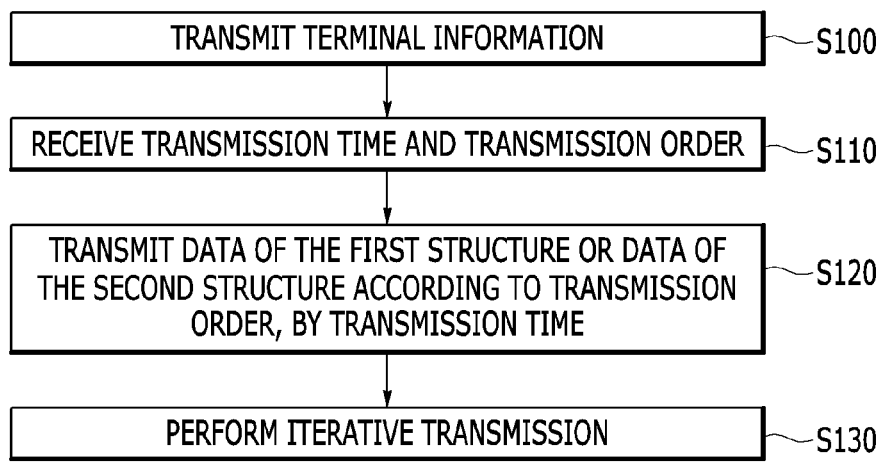
FIG. 6 shows a flowchart of a method for data transmission according to an exemplary embodiment of the present invention.

FIG. 6 shows a flowchart of a method for data transmission according to an exemplary embodiment of the present invention.

In communication between terminals, a terminal transmits the data of the first structure and the data of the second structure for the data to be transmitted.

For this, for example, the terminal transmits terminal information for determining transmission time, such as the movement speed of the terminal or the number of receptions to a base station (S100). When transmitting the number of receptions, the terminal further transmits a terminal ID and an ACK/NACK representing whether or not data is successfully restored.

The base station may determine transmission time by terminals based on the terminal information transmitted from each terminal in order to improve the performance of the data transmission/reception between terminals. Also, the base station may determine a structure of a data channel. That is, the base station may determine the order i for transmitting the data of the first structure and the order j for transmitting the data of the second structure. The base station transmits information on the transmission time and the order for transmitting to the terminal.

The terminal receives the transmission time and the order for transmitting from the base station (S110), and performs data transmission based on them. The terminal transmits the data of the first structure and the data of the second structure for the data to be transmitted (S120). Data is transmitted in units of a data block, and the data block is configured with multi-TTIs. The data of the first structure is that two DMRSs configured based on a first parameter are disposed within 1 TTI, and the data of the second structure is that two DMRSs configured based on a first parameter are disposed and at least one DMRS configured based on a second parameter is further disposed within 1 TTI. The terminal transmits the data of the first structure or the data of the second structure by transmission time, and transmits the data of the first structure or the data of the second structure according to the transmission order. For example, the data of the first structure may be transmitted at a first transmission time and the data of the second structure may be transmitted at a second transmission time.

Also, the terminal iteratively transmits the same data to be less affected by the mobility (S130).

Figure 7:
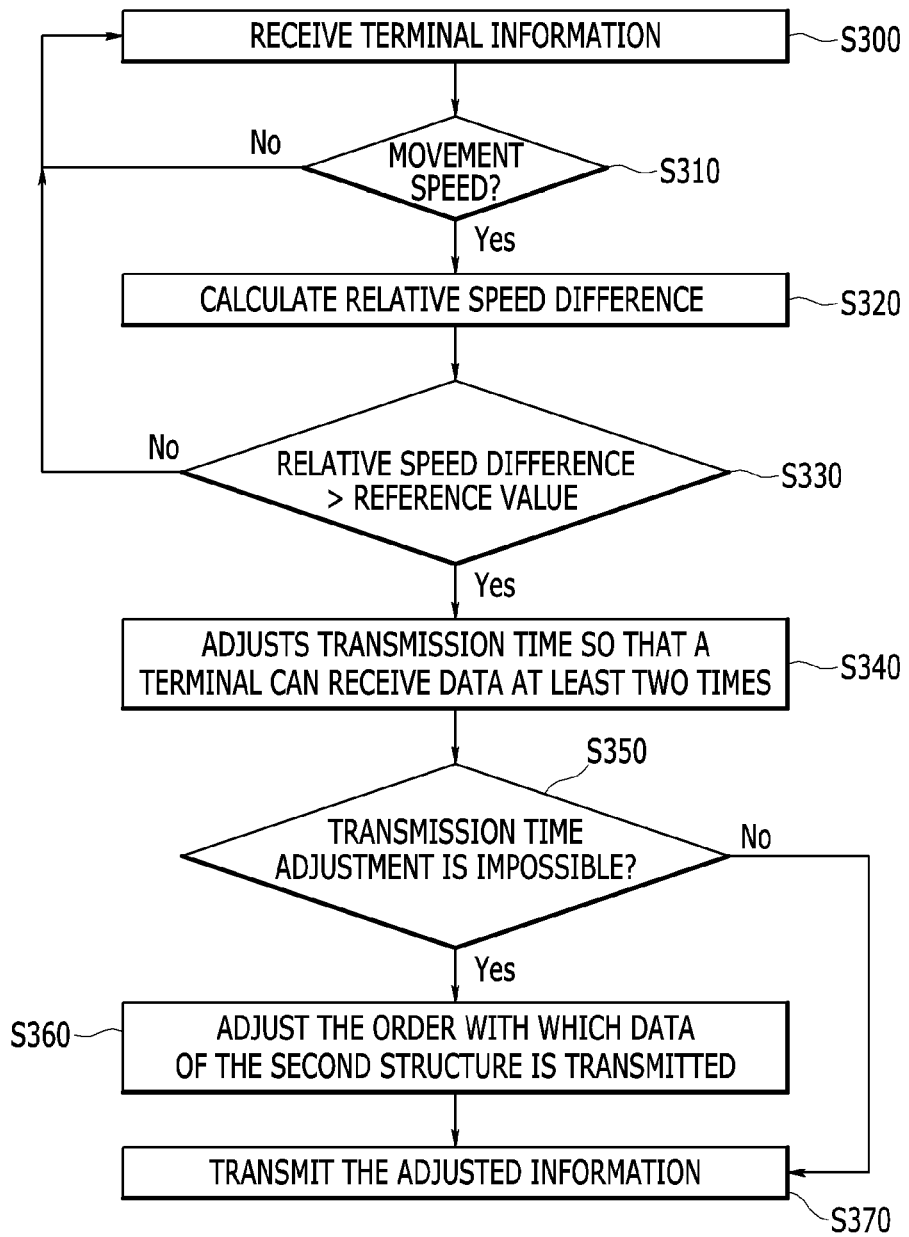
FIG. 7 shows a flowchart of a determination method for a base station to transmit data according to an exemplary embodiment of the present invention.

FIG. 7 shows a flowchart of a determination method for a base station to transmit data according to an exemplary embodiment of the present invention.

A base station receives terminal information from terminals that are located within its cell (S300).

When the terminal information is the movement speeds of terminals (S310), the relative speed difference is calculated based on the movement speeds (S320). For example, the relative speed difference of a terminal is calculated based on the difference between the movement speed of the terminal and the movement speed of the other terminal. The base station compares the relative speed difference with a reference value (S330). When the relative speed difference is greater than the reference value, the base station adjusts the transmission time of at least one among the terminals so that a terminal can receive data transmitted from the opponent terminal at least two times (S340).

Meanwhile, when the transmission time is not set for terminals to receive data two or more times from each other due to a plurality of terminals (S350), the base station adjusts the order with which a transmitting terminal transmits the data of the second structure so that the data received once by a receiving terminal is configured with the PSSCH 2 (S360). Then, the base station transmits the information on the adjusted transmission time and/or the transmission order to the terminals (S370).

Figure 8:
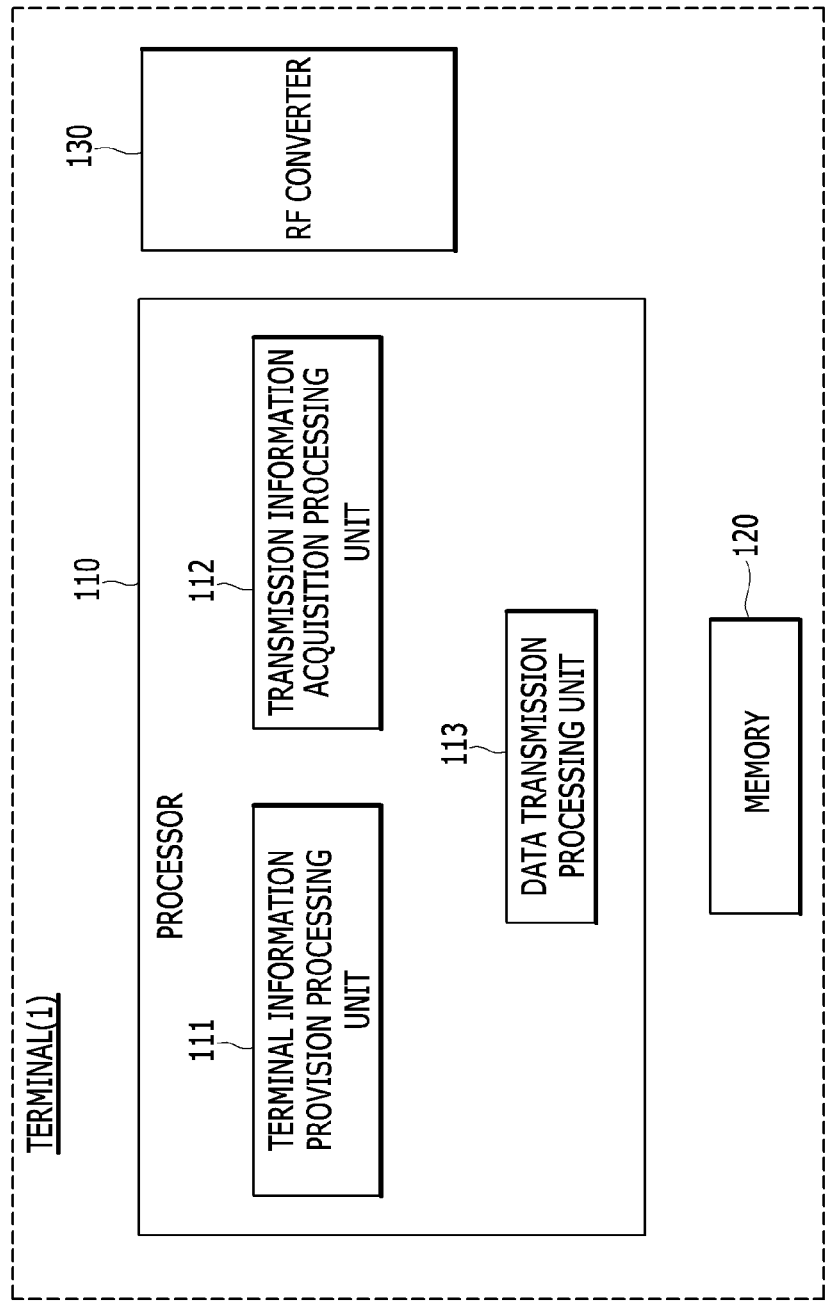
FIG. 8 shows a structure of a terminal according to an exemplary embodiment of the present invention.

FIG. 8 shows a structure of a terminal according to an exemplary embodiment of the present invention.

As shown in FIG. 8, a terminal 10 according to an exemplary embodiment of the present invention includes a processor 110, a memory 120, and a radio frequency (RF) converter 130.

The processor 110 may be configured to implement the methods described based on FIG. 1 to FIG. 6.

For this purpose, the processor 110 includes a terminal information provision processing unit 111, a transmission information acquisition processing unit 112, and a data transmission processing unit 113.

The terminal information provision processing unit 111 is configured to provide movement speed of a terminal or the number of receptions as terminal information. The terminal information is transmitted through the RF converter 130 to the base station. When transmitting the number of receptions, the terminal information provision processing unit 111 further provides an ID of a terminal and an ACK/NACK representing whether or not data is successfully restored. When the size of the message including the terminal information is greater than a predetermined size, the terminal information provision processing unit 111 provides an ID of a terminal and the number of receptions as the terminal information without the NACK when whether or not data is successfully restored is the NACK.

The transmission information acquisition processing unit 112 is configured to acquire information on the transmission time and the order for transmitting the data of the first structure and the data of the second structure. The information may be provided from the base station.

The data transmission processing unit 113 is configured to transmit the data of the first structure and the data of the second structure for the data to be transmitted through the RF converter 130. Specifically, the data of the first structure or the data of the second structure is transmitted by transmission time. Also, the data of the first structure or the data of the second structure is transmitted according to the order. In addition, the same data is iteratively transmitted, and the iterative data transmission may be performed based on the maximum number of iterative transmissions.

The memory 120 is connected to the processor 110, and stores various information associated with an operation of the processor 110. The memory 120 may be configured to store instructions to be performed in the processor 110 or load and temporarily store an instruction from a storage (not shown). The processor 110 may be configured to execute the instruction which is stored in the memory 120 or is loaded from the storage. The processor 110 and the memory 120 may be connected via a bus (not shown), and an input/output interface (not shown) is also connected to the bus.

The RF converter 130 is connected with the processor 110, and transmits or receives a wireless signal.

Figure 9:
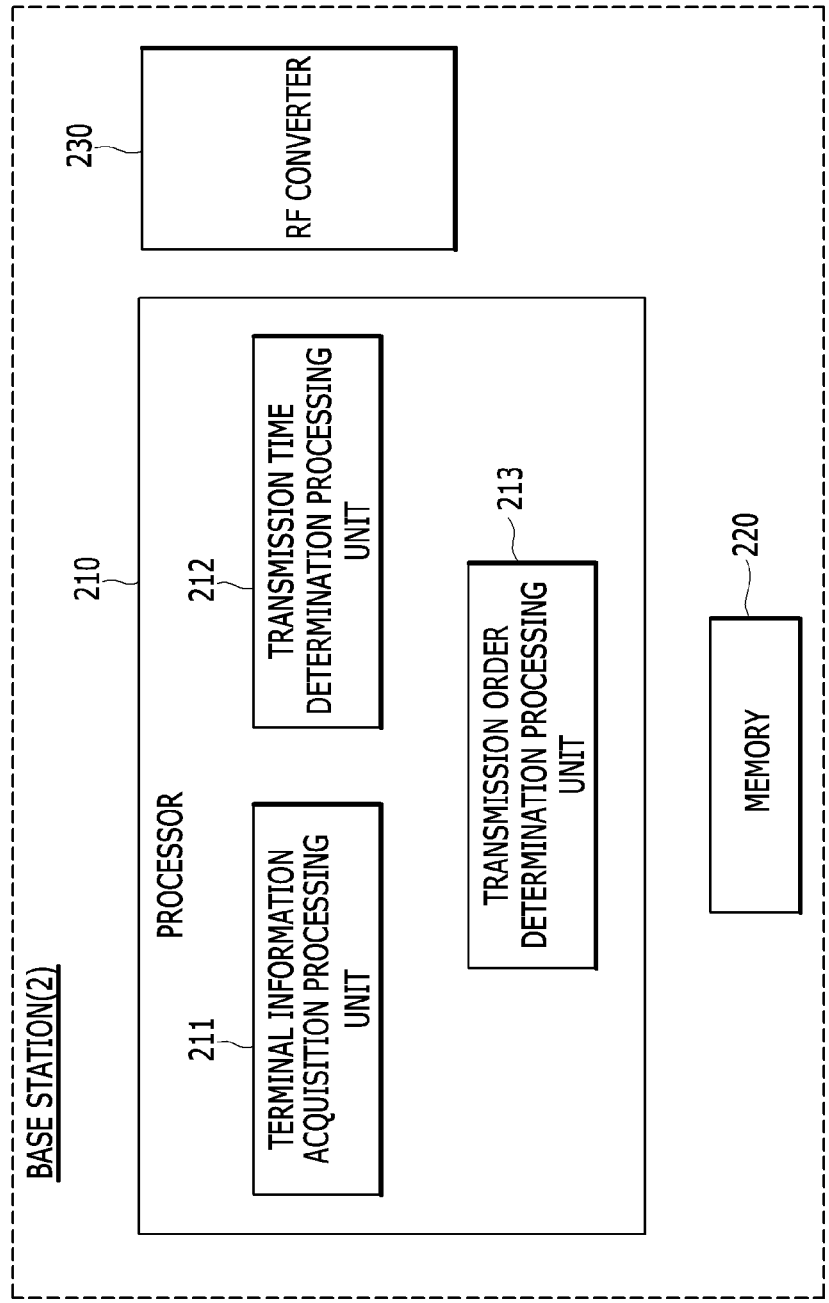
FIG. 9 shows a structure of a base station according to an exemplary embodiment of the present invention.

FIG. 9 shows a structure of a base station according to an exemplary embodiment of the present invention.

As shown in FIG. 9, a base station 20 according to an exemplary embodiment of the present invention includes a processor 210, a memory 220, and an RF converter 230.

The processor 210 may be configured to implement the methods described based on FIG. 1 to FIG. 5 and FIG. 7.

For this purpose, the processor 210 includes a terminal information acquisition processing unit 211, a transmission time determination processing unit 212, and a transmission order determination processing unit 213.

The terminal information acquisition processing unit 211 is configured to receive terminal information from terminals which are located within its cell. The terminal information includes movement speed of a terminal or the number of receptions. When the number of receptions is included in the terminal information, a terminal ID and an ACK/NACK representing whether or not data may be further included in the terminal information is included.

The transmission determination processing unit 212 is configured to determine the transmission time of the terminal based on the terminal information. The transmission time determination processing unit 212 is configured to calculate the relative speed difference of the terminal based on the movement speeds when the terminal information is the movement speeds of terminals, and adjust the transmission time of at least one among the terminals based on the relative speed difference so that a terminal can receive data transmitted from the opponent terminal at least two times.

The transmission order determination processing unit 213 is configured to determine the order for transmitting the data of the first structure and the order for transmitting the data of the second structure based on the terminal information. When the transmission time is not set for terminals to receive data two or more times from each other due to a plurality of terminals, the transmission order determination processing unit 213 adjusts the order with which a transmitting terminal transmits the data of the second structure so that the data received once by a receiving terminal is the data of the second structure.

The memory 220 is connected to the processor 210 and stores various information associated with an operation of the processor 210. The memory 220 may be configured to store performance instructions in the processor 210, or load and temporarily store an instruction from a storage (not shown). The processor 210 may be configured to execute the instruction which is stored in the memory 220 or is loaded from the storage. The processor 210 and the memory 220 may be connected via a bus (not shown), and an input/output interface (not shown) is also connected to the bus.

The RF converter 230 is connected with the processor 210 and transmits or receives a wireless signal.

According to an exemplary embodiment of the present invention, in direct communication between terminals, a data channel structure suitable for a channel of high movement speed and a data channel structure efficient for various movement speeds in iterative transmission are optionally provided, and/or transmission time adjustment for a terminal requiring iterative reception is performed.

Therefore, it is possible to perform communication between terminals to be efficient for the mobility.

The above-mentioned exemplary embodiments of the present invention are not implemented only by an apparatus and/or method described above. Alternatively, the above-mentioned exemplary embodiments may be embodied by a program performing functions which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a terminal to transmit data in direct device-to-device communication, the method comprising:
    configuring at least one first demodulation reference signal (DMRS) based on a first parameter;
    configuring at least one second DMRS based on a second parameter, wherein the second DMRS is configured based on common sequence; and
    transmitting, according to the terminal's movement speed, data of a first structure in which the first DMRS is disposed or data of a second structure in which both of the first DMRS and the second DMRS are disposed;
    transmitting, by the terminal, information for determining the transmission time to the base station,
    wherein the first DMRS and the second DMRS is for channel estimation for data demodulation, and the first parameter and the second parameter are based on a parameter received from a base station to which the terminal belongs to,
    wherein the information includes at least one among the terminal's movement speed and number of receptions, and
    wherein the transmission time at which the data of the first structure is transmitted and the transmission time at which the data of the second structure is transmitted are determined by the base station using the information.

2. The method of claim 1, wherein the first DMRS is scrambled using an identification (ID) of a terminal, and the data is transmitted through a Physical Sidelink Shared Channel (PSSCH).

3. The method of claim 2, wherein a transmission time at which the data of the first structure is transmitted and a transmission time at which the data of the second structure is transmitted are adjusted based on information that has been transmitted by the terminal to a base station.

4. The method of claim 3, wherein an order for transmitting the data of the first structure and an order for transmitting the data of the second structure are adjusted by the base station in iterative transmission.

5. The method of claim 1, wherein the transmitting comprises
    transmitting the data of the first structure when the movement speed is slower than a predetermined speed; and
    transmitting the data of the second structure when the movement speed is faster than the predetermined speed.

6. The method of claim 1, wherein both of the data of the first structure and the data of the second structure are transmitted in retransmission.

7. The method of claim 1, wherein the transmission time is determined based on the ID of the terminal and an Acknowledgment/Negative acknowledgement (ACK/NACK) representing whether or not data is successfully restored as well as the number of receptions when the information includes the number of receptions.

8. The method of claim 7, wherein the transmitting of information comprises transmitting a message including the ID of the terminal and the number of receptions to the base station if whether or not data is successfully restored is the NACK when a size of a message including the information is greater than a predetermined size.

9. The method of claim 8, wherein the transmission order is adjusted so that data received once between terminals communicating with each other is the data of the second structure, and
    the transmission time is adjusted when a relative speed difference is greater than a predetermined reference value so that terminals communicating with each other receive data transmitted from an opponent terminal two or more times.

10. The method of claim 1, wherein the first parameter and the second parameter are orthogonal in the common sequence or an orthogonal signal is configured by using the first parameter and the second parameter in the common sequence.

11. A terminal for transmitting data in communication between terminals, the terminal comprising:
    a radio frequency converter transmitting and receiving a signal through an antenna; and
    a processor that is connected to the radio frequency converter and is configured to perform processing for data transmission,
    wherein the processor includes a data transmission processing unit configured to transmit data of a first structure or data of a second structure according to the terminal's movement speed, and wherein at least one first demodulation reference signal (DMRS) configured based on a first parameter is disposed in the first structure, at least one second DMRS configured based on a second parameter is further disposed in addition to the first DMRS in the second structure, and the second DMRS is configured based on a common sequence, wherein the first parameter and the second parameter are based on a parameter received from a base station to which the terminal belongs to, wherein the terminal transmits information for determining the transmission time to the base station, wherein the information includes at least one among the terminal's movement speed and number of receptions, and wherein the transmission time at which the data of the first structure is transmitted the transmission time at which the data of the second structure is transmitted are determined by the base station using the information.

12. The terminal of claim 11, wherein the data transmission processing unit is configured to transmit one among the data of the first structure and the data of the second structure every transmission time, wherein the processor further comprises a transmission information acquisition processing unit configured to receive a transmission order including an order for transmitting the data of the first structure and an order for transmitting the data of the second structure that are provided from a base station.

13. The terminal of claim 12, wherein the data transmission processing unit is configured to iteratively transmit the data having been transmitted, wherein a transmission time at which the data of the first structure is transmitted and a transmission time at which the data of the second structure is transmitted are adjusted by the base station, and the order for transmitting the data of the first structure and the order for transmitting the data of the second structure are adjusted by the base station.

14. The terminal of claim 12, wherein the processor further comprises a terminal information provision processing unit configured to provide information for determining the transmission time to the base station, wherein the information includes at least one among movement speed of the terminal and number of receptions to the base station.

15. The terminal of claim 11, wherein the data transmission processing unit is configured to transmit the data of the first structure when the movement speed is slower than a predetermined speed, and to transmit the data of the second structure when the movement speed is faster than the predetermined speed.

16. A method for a terminal to transmit data in direct device-to-device communication, the method comprising:

configuring at least one first demodulation reference signal (DMRS) based on a first parameter;

configuring at least one second DMRS based on a second parameter, wherein the second DMRS is configured based on common sequence, wherein the first DMRS and the second DMRS is for channel estimation for data demodulation; and transmitting, according to a Modulation Coding Scheme (MCS), data of a first structure in which the first DMRS is disposed or data of a second structure in which both of the first DMRS and the second DMRS are disposed;

transmitting, by the terminal, information for determining the transmission time to the base station, wherein the first parameter and the second parameter are based on a parameter received from a base station to which the terminal belongs to, wherein the information includes at least one among the terminal's movement speed and number of receptions, and wherein the transmission time at which the data of the first structure is transmitted the transmission time at which the data of the second structure is transmitted are determined by the base station using the information.

17. The method of claim 16, wherein the transmitting comprises transmitting data of a first structure when the MCS is lower than a predetermined level; and transmitting data of a second structure when the MCS is higher than predetermined level.

18. The method of claim 16, wherein both of the data of the first structure and the data of the second structure are transmitted in retransmission, and a transmission time at which the data of the first structure is transmitted and a transmission time at which the data of the second structure is transmitted are adjusted based on information that has been transmitted by the terminal to a base station, wherein the information includes at least one among the terminal's movement speed and number of receptions, and an order for transmitting the data of the first structure and an order for transmitting the data of the second structure are adjusted by the base station in iterative transmission.

19. The method of claim 16, wherein the first parameter and the second parameter are orthogonal in the common sequence or an orthogonal signal is configured by using the first parameter and the second parameter in the common sequence.

* * * * *